(12) United States Patent
Friesen (10) Patent No.: US 6,702,035 B1
(45) Date of Patent: Mar. 9, 2004

(54) FORWARDLY FOLDING TOOL BAR (76) Inventor: Milford E. Friesen, One S. Douglas Rd., Douglas, NE (US) 68344

( * ) Notice: Subject to any disclaimer, the term of this patent is extended or adjusted under 35 U.S.C. 154(b) by 0 days.

(21) Appl. No.: 10/403,039

(22) Filed: Apr. 1, 2003

(51) Int. Cl.[7] .............................................. A01B 49/00
(52) U.S. Cl. ...................................................... 172/311
(58) Field of Search ................................ 172/311, 456, 172/457, 470, 481, 669, 776, 397, 407, 413, 450; 111/54, 55, 57; 280/656

(56) References Cited

U.S. PATENT DOCUMENTS 4,945,997 A * 8/1990 Adee .......................... 172/311
5,113,956 A * 5/1992 Friesen et al. ............... 172/311
5,839,516 A * 11/1998 Arnold et al. ............... 172/456
6,408,950 B1 * 6/2002 Shoup ......................... 172/311

* cited by examiner

Primary Examiner—Robert E. Pezzuto
(74) Attorney, Agent, or Firm—Thomte, Mazour & Niebergall; Dennis L. Thomte (57) ABSTRACT

A forwardly folding tool bar comprising a center tool bar section positioned rearwardly of a pair of wing hinge tubes with wing tool bar sections being operatively pivotally secured to the outer ends of the wing hinge tubes. The tool bar includes a telescoping tongue including a latching device which prevents an inner tongue tube from sliding rearwardly with respect to an outer tongue tube. The latching device is automatically unlatched when a forwardly extending hitch is pivotally moved with respect to the tongue to a transport position. The tool bar sections are supported by vertically adjustable gauge wheel assemblies.

15 Claims, 8 Drawing Sheets

FORWARDLY FOLDING TOOL BAR

BACKGROUND OF THE INVENTION

1. Field of the Invention

This invention relates to a folding tool bar and more particularly to a forwardly folding tool bar.

2. Description of the Related Art

Tool bars are commonly used in farming operations. The conventional tool bars normally consist of a transversely extending tool bar or frame member having a tongue or hitch secured thereto which extends forwardly therefrom for attachment to a prime mover such as a tractor. Attachments such as cultivators, planter units, stalk cutters, etc., are mounted on the tool bar to perform various farming operations. A major problem associated with conventional tool bars is that the working or field width thereof must be substantially reduced to enable the implement to be transported from one location to another. Many types of tool bars employ a center tool bar section having wing tool bar sections extending outwardly therefrom. In certain of the prior art tool bars, the wings are pivoted from a substantially horizontal working field position to an upright transport position. In most folding tool bars of this type, the upright position of the wings is not as stable as desired and may create undesirable stress on certain components of the tool bar.

A further problem associated with the conventional folding tool bars is that they are not sufficiently flexible to compensate for irregular terrain such as in hill country, terraces, etc. Yet another disadvantage of the prior art devices is that the wheels which support the tool bar interfere with the mounting of various attachments on the tool bar due to the location of the wheels on the tool bar. Still another disadvantage of the conventional prior art tool bars is that they are difficult to move from the field position to the transport position and vice versa.

Many of the problems associated with the prior art tool bars were solved by the forwardly folding tool bar of applicant's U.S. Pat. No. 5,113,956 which issued May 19, 1992. Although the tool bar of U.S. Pat. No. 5,113,956 has experienced considerable commercial success, the need exists to reduce the number of structural elements, and hence reduce the cost thereof, without sacrificing strength, heft, performance, durability, aesthetics, etc.

SUMMARY OF THE INVENTION

The instant design relocates many structural elements of the '956 tool bar which permits the consolidation of multiple pieces into one improved part. The number of parts to complete the tool bar mainframe of this invention is approximately one-half of the '956 tool bar.

The forward folding tool bar of this invention comprises an elongated, transversely extending center tool bar section which has opposite ends and rearward and forward sides. A support means is secured to the center tool bar section and extends forwardly therefrom with the support means having a first end, a second end, a rearward end and a forward end. The center tool bar section has height adjustable ground engaging wheels mounted thereon. An elongated inner tongue tube is secured at its rearward end to the center tool bar section and extends forwardly therefrom. The inner end of a right wing hinge is pivotally secured to the first end of the support means forwardly of the rearward end thereof with the right wing hinge being selectively movable between a field position, wherein the right wing hinge is parallel to the center tool bar section, to a transport position, wherein the right wing hinge is positioned generally parallel to the inner tongue tube and laterally outwardly therefrom. A hydraulic cylinder interconnects the support means and the right wing hinge for moving the right wing hinge between its field position and its transport position. The inner end of a left wing hinge is pivotally secured to the second end of the support means forwardly of the rearward end thereof. The left wing hinge is selectively movable between a field position, wherein the left wing hinge is parallel to the center tool bar section, to a transport position, wherein the left wing hinge is positioned generally parallel to the inner tongue tube and laterally outwardly therefrom. A hydraulic cylinder interconnects the support means and the left wing hinge for moving the left wing hinge between its field position and its transport position. The inner end of a right front wing tube is pivotally secured, about a horizontal axis, to the outer end of the right wing hinge. The inner end of a left front wing tube is pivotally secured, about a horizontal axis, to the outer end of left wing hinge. A right tool bar is secured to the right front wing tube for movement therewith and is positioned rearwardly thereof. A left tool bar is secured to the left front wing tube for movement therewith and is positioned rearwardly thereof. The center tool bar section and the right and left tool bars are adapted to have row units mounted thereon.

An outer tongue tube slidably embraces the inner tongue tube and has a rearward end, a forward end and upper and lower ends. An elongated hitch has its rearward end pivotally secured to the outer tongue tube rearwardly of the forward end thereof and extends forwardly therefrom for connection to a tractor or the like. A hydraulic cylinder is pivotally secured to the hitch and the outer tongue tube so that the hydraulic cylinder, when in its retracted position, causes the forward end of the outer tongue tube to be positioned in a field position and so that when the hydraulic cylinder is in its extended position, it causes the forward end of the outer tongue tube to be raised to a transport position. Elongated draft tubes are pivotally secured to the right and left tool bars and the outer tongue tube. The inner tongue tube is slidably moved rearwardly relative to the outer tongue tube as the wing hinges, and the right and left tool bars, are moved from their field positions to their transport positions.

It is therefore a principal object of the invention to provide an improved folding tool bar.

Still another object of the invention is to provide a forwardly folding tool bar.

Still another object of the invention is to provide a folding tool bar wherein the wheels which support the tool bar are mounted thereon in such a position so as not to interfere with the mounting of attachments thereon.

Still another object of the invention is to provide a folding tool bar which has sufficient flexibility to enable the tool bar to be used in hilly country or on terraces.

Still another object of the invention is to provide a forwardly folding tool bar which is quickly and easily moved from a working field position to a transport position and vice versa.

Yet another object of the invention is to provide a forwardly folding tool bar which is economical of manufacture and durable in use.

Yet another object of the invention is to provide a forwardly folding tool bar which has a reduced number of structural elements.

Still another object of the invention is to provide a forwardly folding tool bar which is economical to produce without sacrificing strength, heft, performance, durability or aesthetics.

Yet another object of the invention is to provide a forwardly folding tool bar which has a more narrow transport width than the folding tool bars of the prior art.

Still another object of the invention is to provide a forwardly folding tool bar which enables planter units to be conveniently mounted thereon in 15", 18", 20", 22", 30", 32" and 36" width spacing with standard U-bolts.

Still another object of the invention is to provide a forwardly folding tool bar wherein the gauge wheel assemblies thereon are easily moved for different row spacing.

Still another object of the invention is to provide a forwardly folding tool bar wherein the wings thereof are stronger than the prior art tool bars which enables the tool bar to have greater widths than those of the prior art.

These and other objects of the present invention will be obvious to those skilled in the art.

DESCRIPTION OF THE PREFERRED EMBODIMENT

The numeral 10 refers to the forwardly folding tool bar of this invention. The tool bar includes a center tool bar section 12 having a right end 14 and a left end 16. Center tool bar section 12 is preferably a 7"×7"×⅜" steel tube and is adapted to have row units such as planters, cultivators, etc., mounted thereon in conventional fashion. A pair of vertically movable gauge wheel assemblies 18 and 20 are secured to the center tool bar section 12 in conventional fashion for raising and lowering the center tool bar section 12 in conventional fashion. Support means 22 is secured to the center tool bar section at the center thereof and comprises an upper plate 24 and a lower plate 26.

Figure 2:
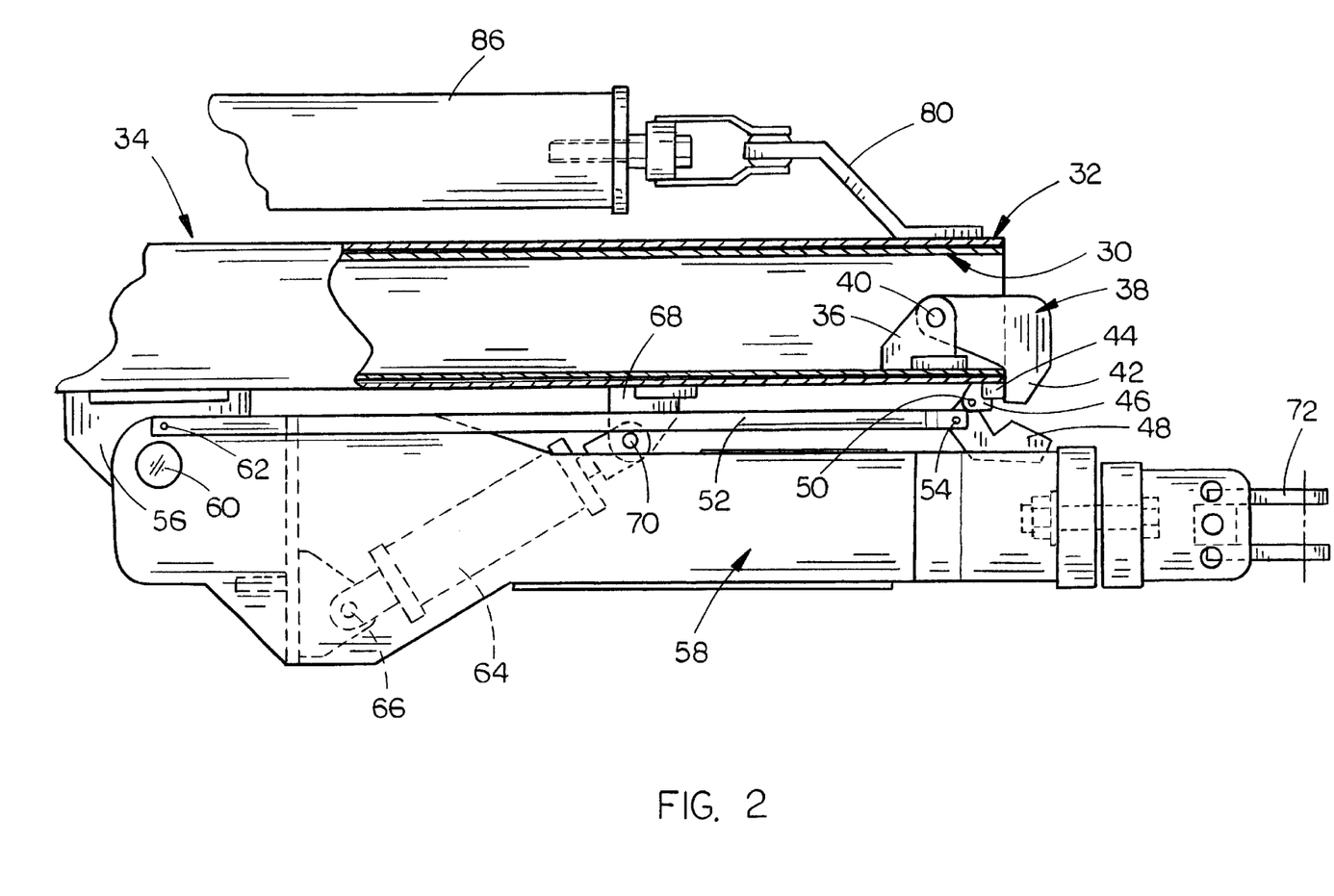
FIG. 2 is a partial side view of the forward end of the tool bar of this invention with portions thereof cut away to more fully illustrate the invention.
Figure 3:
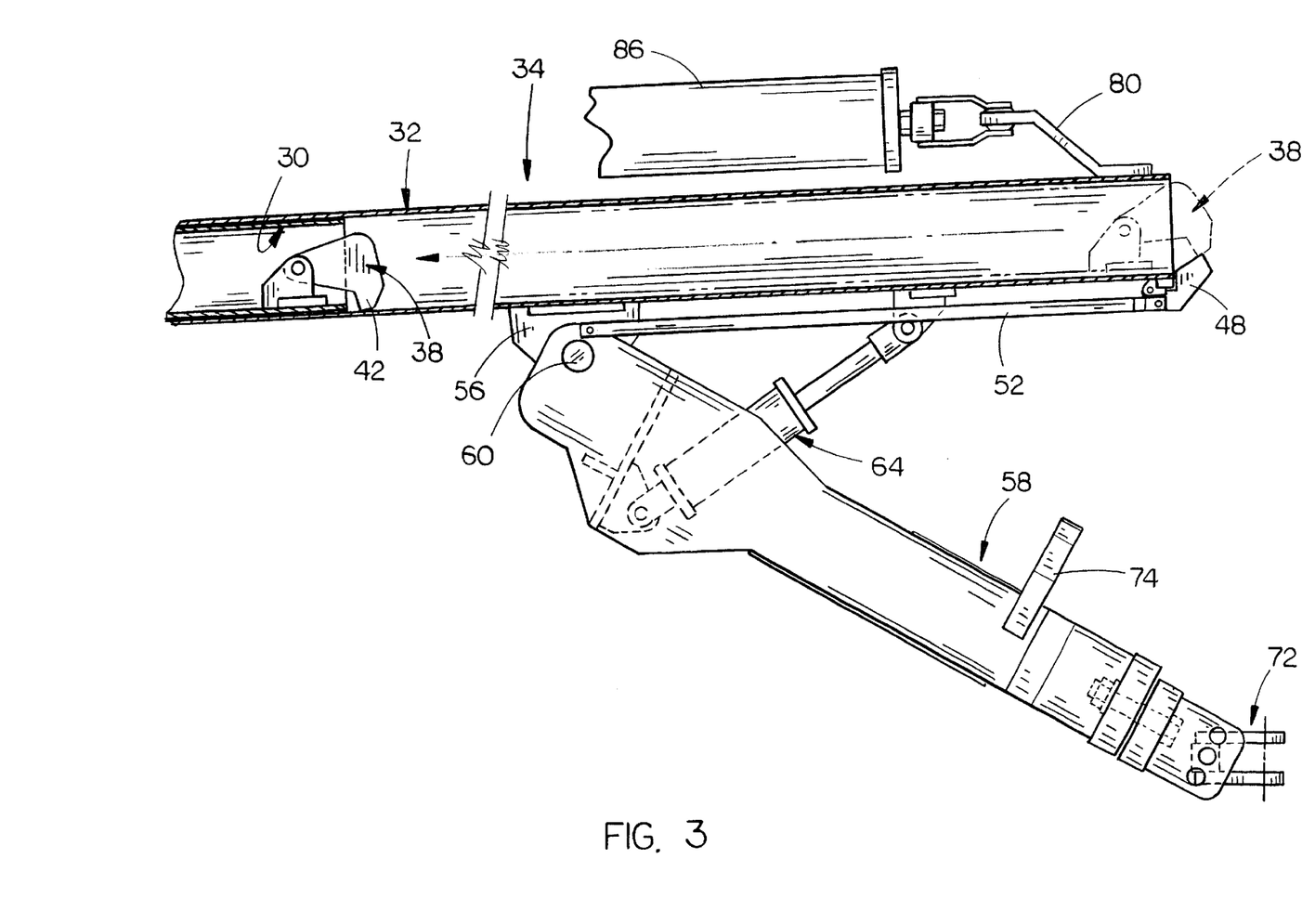
FIG. 3 is a view similar to FIG. 2 except that the hitch and tongue have been As moved to their transport positions.

Support tube 28 is positioned between the plates 24 and 26 and is secured thereto by any convenient means. The rearward end of inner tongue tube 30 is received by the tube support 28 and is secured thereto by welding or the like. An outer tongue tube 32 slidably embraces inner tongue tube 30 to form a telescopic tongue generally referred to by the reference numeral 34. Outer tongue tube 32 and inner tongue tube 30 are slidably movable with respect to one another between field and transport positions. When the tongue 34 is in the field position, the forward ends of the inner tongue tube 30 and outer tongue tube 32 are positioned closely adjacent one another as illustrated in FIG. 2. When the tongue 34 is in the transport position, as will be explained in greater detail hereinafter, the forward end of the outer tongue tube 32 is positioned forwardly of the forward end of the inner tongue tube 30 (FIG. 3).

Figure 4:
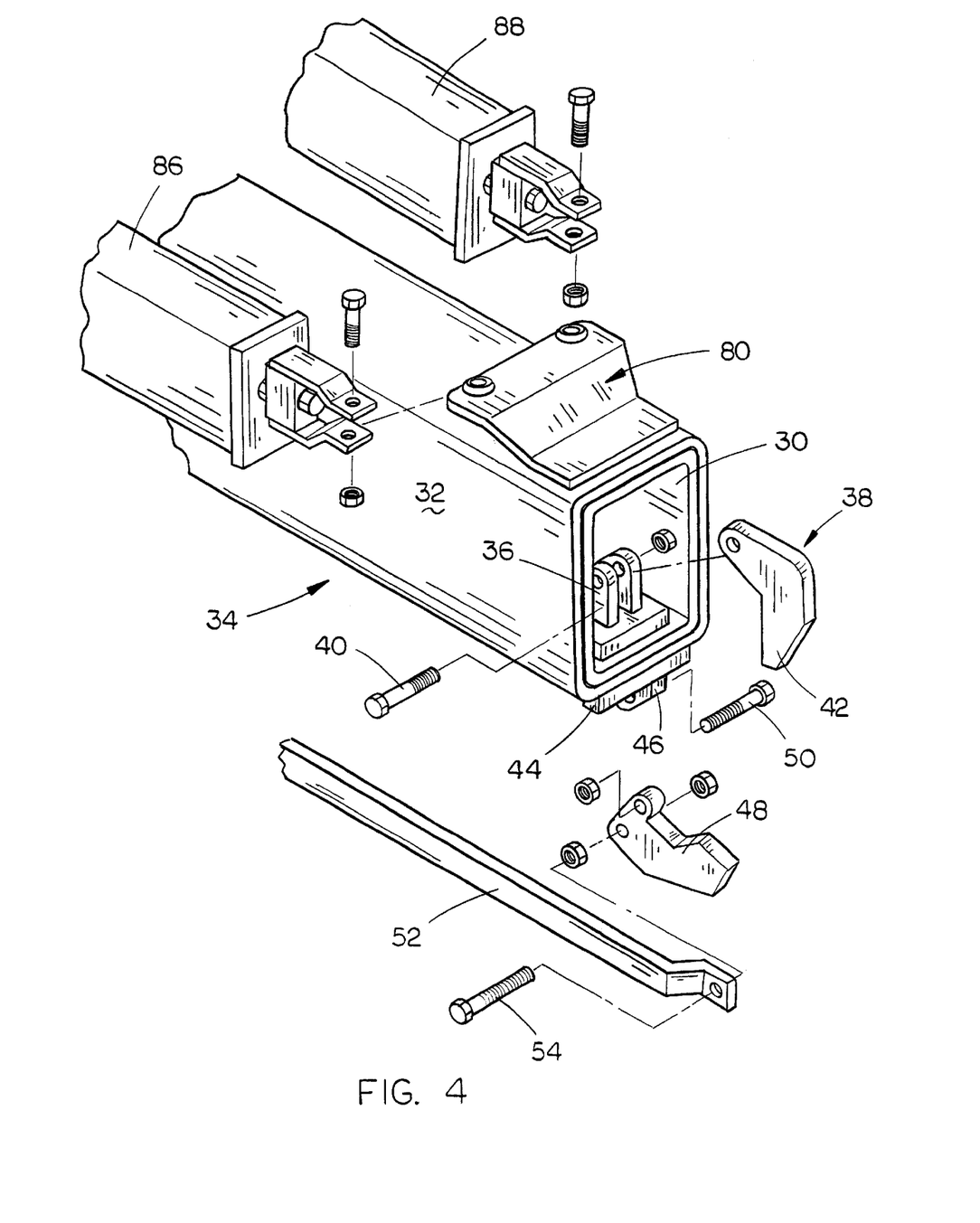
FIG. 4 is a partial front exploded perspective view of the tongue and related structure.

The numeral 36 refers to a hook anchor or support which is secured to the inner bottom surface of inner tongue tube 30 by welding or the like as seen in FIG. 4. A latch hook 38 is pivotally connected to anchor 36 by bolt or pin 40 and includes a downwardly extending hook portion 42 which extends downwardly adjacent the forward ends of inner tongue tube 30 and outer tongue tube 32 when the tongue 34 is in its field position (FIG. 2). When the latch hook 38 is in the position of FIG. 2, the rearward end of hook portion 42 engages latch 44 to prevent rearward telescopic movement of inner tongue tube 30 with respect to outer tongue tube 32. As seen in FIG. 2, bracket 46 is secured to the bar 44 and/or the underside of outer tongue tube 32 and has an activator 48 pivotally secured thereto by bolt or pin 50. The forward end of latch bar 52 is pivotally connected to the activator 48 by bolt or pin 54.

Bracket or plate 56 is welded to the underside of outer tongue tube 32 rearwardly of the forward end thereof and has the rearward end of an elongated hitch 58 pivotally secured thereto by pivot pin 60. The rearward end of latch bar 52 is pivotally connected to the upper rearward end of hitch 58 by pivot pin 62 (FIG. 2). A hydraulic cylinder 64 has one end thereof pivotally secured to hitch 58 at 66. The rod end of the hydraulic cylinder 64 is pivotally connected to bracket 68, which is secured to the underside of outer tongue tube 32 by welding or the like, by pivot pin 70. When hydraulic cylinder 64 is in the retracted field position of FIG. 2, latch bar 52 maintains the activator 48 in a spaced or disengaged relationship with respect to the hook portion 42 of latch hook 38. When hydraulic cylinder 64 is in the extended transport position of FIG. 3, latch bar 52 has been moved forwardly from the position of FIG. 2 so that the activator 48 has been pivoted upwardly to disengage hook portion 42 from the latch 44. With the latch hook 38 in the raised position of FIG. 3, the inner tongue tube 30 is able to slidably move rearwardly with respect to outer tongue tube 32.

Figure 9:
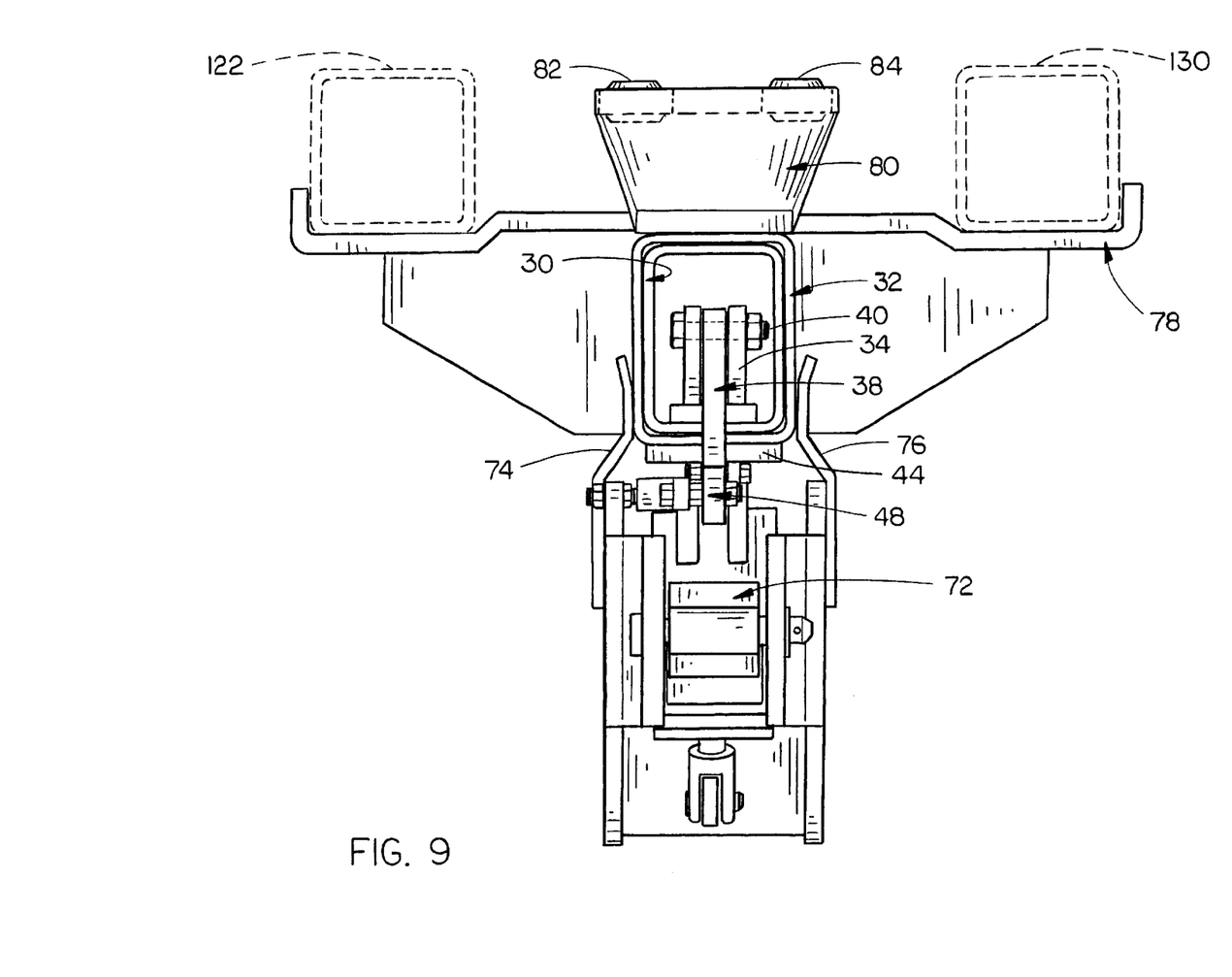
FIG. 9 is a front view of the tongue and hitch of the tool bar with related structure.

Hitch 58 is provided with a clevis 72 of conventional design mounted on the forward end thereof for connection to the drawbar of a prime mover such as a tractor or the like. Clevis 72 could be replaced with other types of attachments to connect the hitch 58 to a tractor. A pair of spaced-apart arms 74 and 76 are secured to the opposite sides of the hitch 58 and extend upwardly therefrom, as illustrated in FIG. 9, to stabilize the hitch 58 against lateral movement with respect to the tongue 34 when the hitch 58 is in its field position of FIG. 9. Transversely extending support 78 is secured to the top surface of outer tongue tube 32 rearwardly of the forward end thereof and is adapted to receive the wing sections thereon as will be described in more detail hereinafter. Plate or bracket 80 is secured, at its lower forward end, to the upper surface of outer tongue tube 32 at the forward end thereof and extends upwardly and rearwardly therefrom, as been seen in FIG. 2. A pair of swivel connectors 82 and 84 are provided on the upper rearward end of the plate 80 and have the forward ends of draft tubes 86 and 88 length-adjustably connected thereto in the manner illustrated in FIG. 2.

Right wing hinge 90 is pivotally connected at its inner end to the forward end of the plates 24 and 26 of support 22 by a vertically disposed float pivot pin 92. One end of hydraulic cylinder 94 is pivotally connected to the outer end of plate 26 in the manner illustrated in FIG. 5 by pin 96. The rod end of cylinder 94 is pivotally connected to plate 98 which is welded to the upper side of right wing hinge 90.

Figure 5:
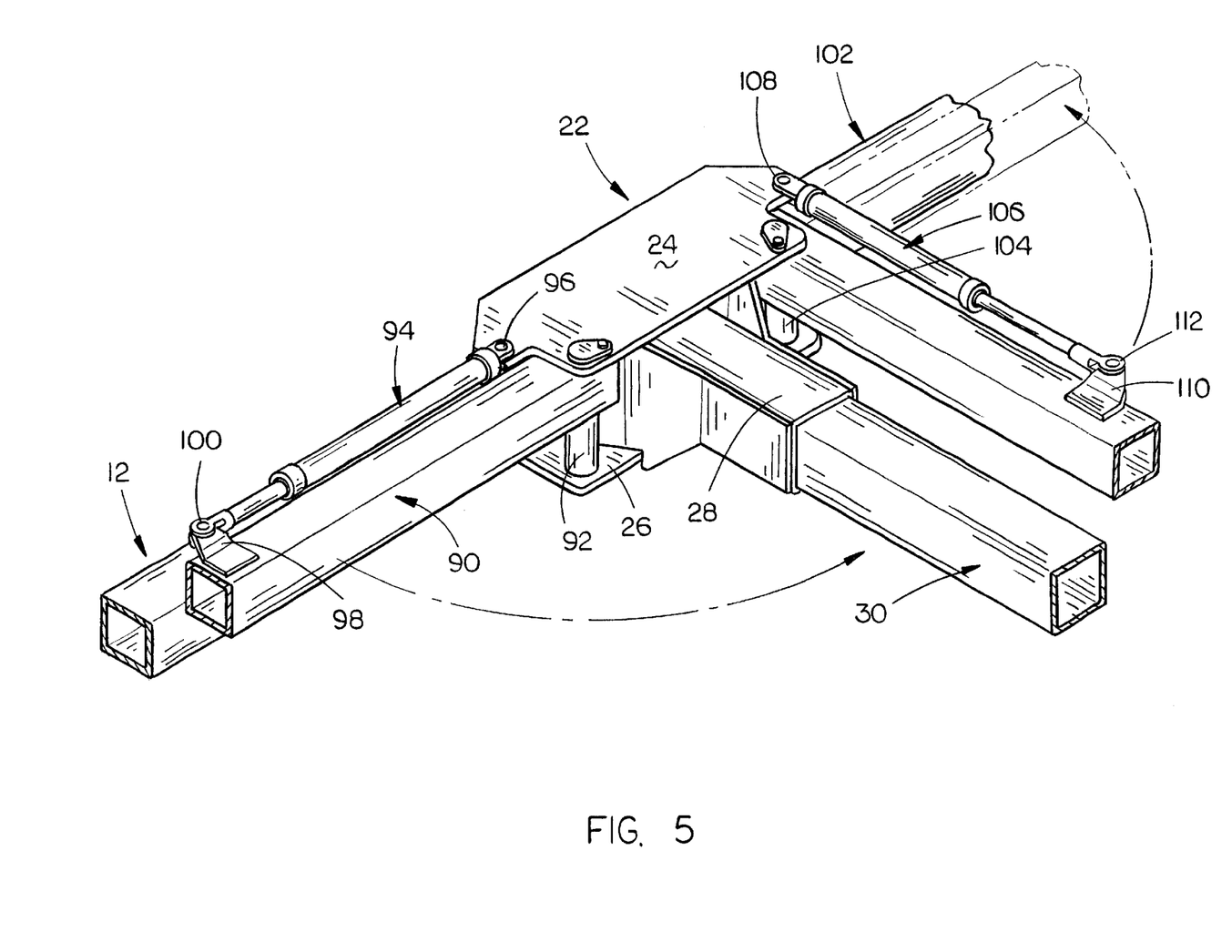
FIG. 5 is a partial front perspective view of the central rearward portion of the tool bar of this invention.
Figure 6:
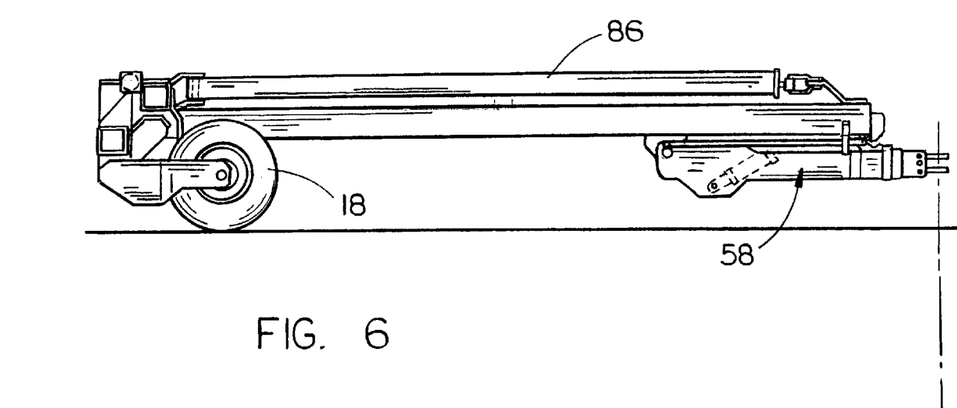
FIG. 6 is a side view illustrating the tool bar of this invention in its field position.

Left wing hinge 102 is pivotally secured to the plates 24 and 26 of support 22 by means of a vertically disposed float pivot pin 104. Hydraulic cylinder 106 has its base end pivotally secured to top plate 24 by pivot pin 108 and has its rod end pivotally secured to plate 110 by pivot pin 112. The hydraulic cylinders 94 and 102 are adapted to selectively pivot the wing hinges 90 and 102 from the transversely extending field position to a transport position wherein they are generally parallel to the tongue 34. As seen in FIG. 5, the wing hinges 90 and 102 are disposed above and forwardly of center tool bar section 12.

Downwardly and outwardly extending hinge sections 114 and 116 are provided at the outer ends of wing hinges 90 and 102, respectively. A horizontally disposed pivot pin 118 pivotally connects hinge section 114 to hinge section 120 which is secured to the inner end of right front wing tube 122. Horizontally disposed hinge pin 126 pivotally connects hinge section 116 to hinge section 128 which is secured to the inner end of left front wing tube 130.

A row unit-carrying right tool bar 132 is positioned rearwardly of right front tube 122 and is secured thereto by a plurality of spaced-apart steel plates 134 secured thereto and extending therebetween. Right tool bar 132 is adapted to have a plurality of row units mounted thereon in conventional fashion. A vertically movable gauge wheel assembly 124 is selectively adjustably mounted on right tool bar 132. The position of the gauge wheel assembly 124 on tool bar 132 will be dependent On the row spacing of the planter units. Similarly, a left tool bar 136 is spaced rearwardly of left front wing tube 130 and is secured thereto by a plurality of spaced-apart steel plates 138. A vertically movable gauge wheel assembly 124' is selectively adjustably mounted on left tool bar 136. The rearward end of draft tube 86 is pivotally connected to plate 140 which is secured to right front wing tube 122 and right tool bar 132. Similarly, the rearward end of draft tube 88 is pivotally secured to plate 142 which is secured to left front wing tube 130 and left tool bar 136. For purposes of description, right front wing tube 122 and right tool bar 132 will be referred to as wing section 150 while left front wing tube 130 and left tool bar 136 will be referred to as wing section 152.

Figure 1:
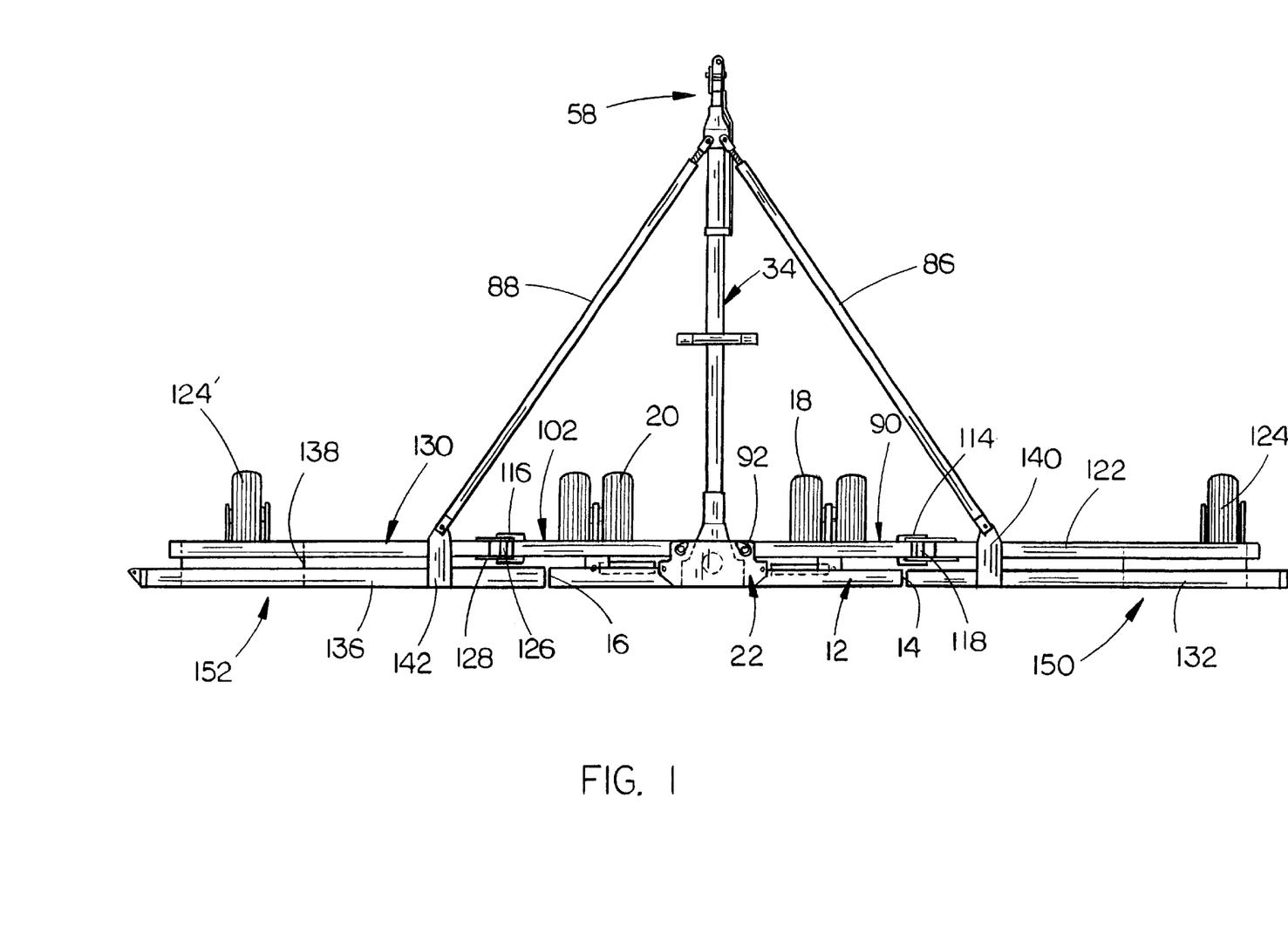
FIG. 1 is a top view of the tool bar of this invention in its field position.

The normal method of operating the tool bar of this invention is as follows. Assuming that the tool bar of this invention is in the field position of FIG. 1, the wing sections 150 and 152 are permitted to flex about horizontal pivot axes defined by pins 118 and 126 so that the tool bar may compensate for irregular terrain such as experienced in hill country, terraces, etc. The forward mounting of the gauge wheel assemblies 18, 20, 124 and 124' ensure that the various row units may be mounted on the tool bar without interference from the wheel.

When it is desired to fold the tool bar of this invention to the transport position, the hydraulic cylinders on the gauge wheel assemblies are operated to raise the tool bar sections relative to the ground to raise the row units or the like out of ground engagement. Hydraulic cylinder 64 is extended which causes the forward end of tongue 34 to be raised from the position of FIG. 2 to the position of FIG. 3. Extension of hydraulic cylinder 64 not only raises the forward end of the tongue 34 but also causes the actuator 48 to pivotally move upwardly to disengage the hook 38 from the latch 144 to enable inner tongue tube 30 to slidably move rearwardly, as will be described in more detail hereinafter, with respect to outer tongue tube 32. Hydraulic cylinders 94 and 106 are then extended to cause the wing sections 150 and 152 to pivotally move from the field position of FIG. 1 to the transport position of FIG. 8. As the wing sections 150 and 152 are pivotally moved forwardly towards the tongue 34, the inner tongue tube 30 is slidably moved rearwardly With respect to outer tongue tube 32 to effectively increase the length of tongue 34 so that adequate space will be provided between the center tool bar section 12 and the tractor to enable the wing sections 150 and 152 to fold forwardly to the position illustrated in FIG. 8. In some cases, the tractor will move forwardly during the extension of the inner and outer tongue tube members rather than the center tool bar section 12 rolling backwards.

Figure 7:
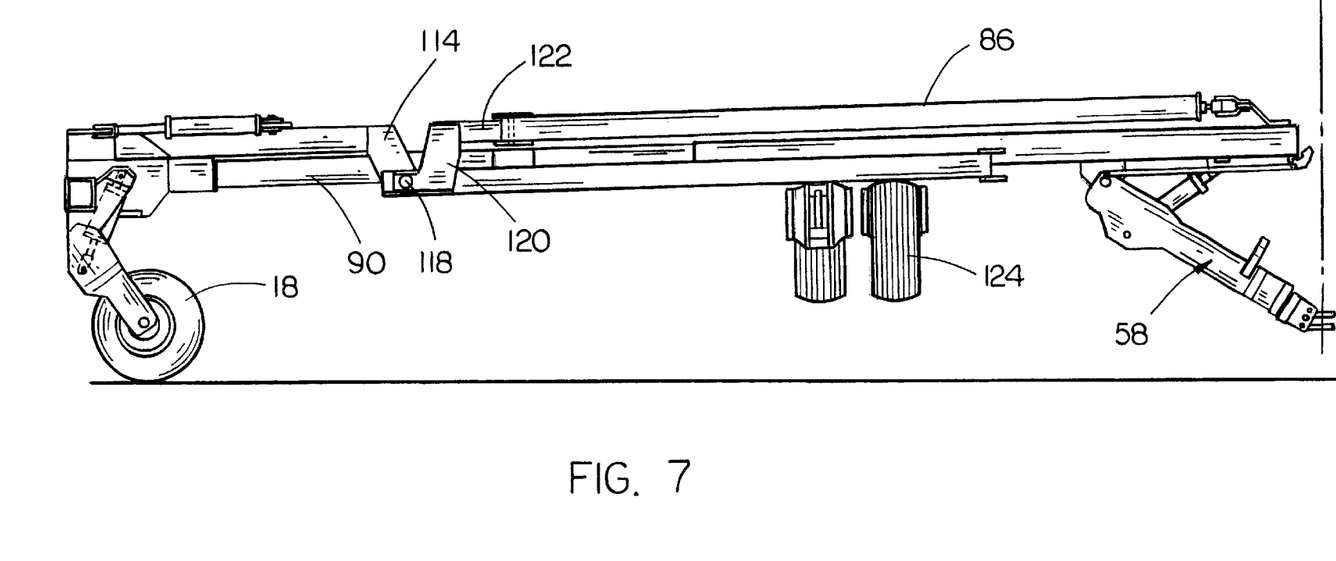
FIG. 7 is a view similar to FIG. 6 except that the tool bar has been moved to its transport position.

Cylinders 94 and 102 are extended until the wing tubes 122 and 130 are positioned above the outer ends of support 78. The gauge wheel assemblies are then operated to lower the tool bar somewhat with respect to the ground so that the wing tubes 122 and 130 are supported upon the support 78, as illustrated in FIG. 9. Continued retraction of the cylinders controlling the gauge wheel assemblies 124 and 124' causes the wheels of those gauge assemblies to be raised out of ground engagement, as illustrated in FIG. 7, so that the tool bar will only be supported by the gauge wheel assemblies 18 and 20.

Figure 8:
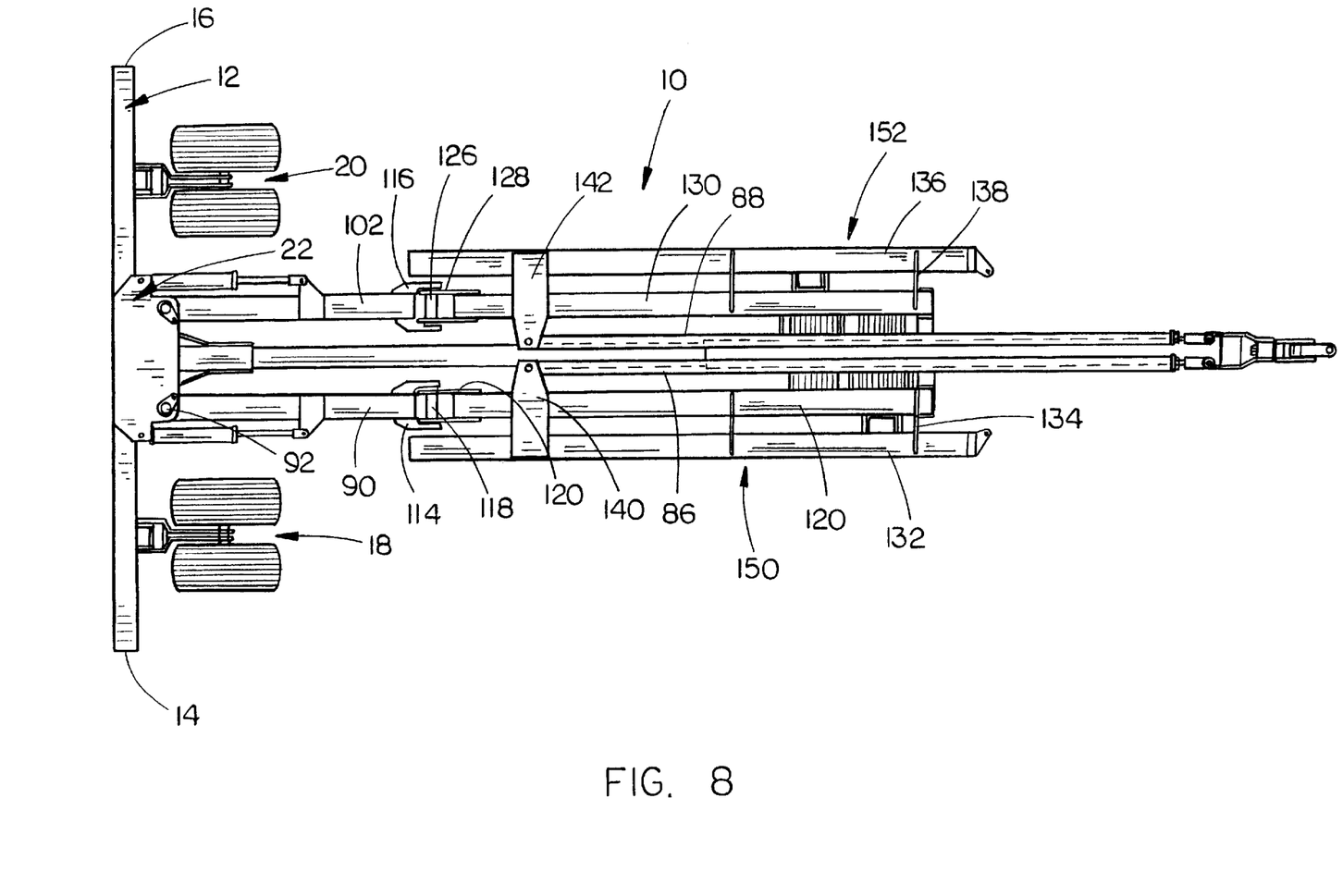
FIG. 8 is a top view of the tool bar in its transport position.

When the tool bar is in the transport position of FIG. 8, the tool bar may be easily moved from one location to another. When it is desired to move the tool bar to its field position, the gauge wheel assemblies 124 and 124' are lowered into ground engagement so that the wing tubes 122 and 130 disengage from the support 78. Hydraulic cylinders 94 and 106 are then retracted which causes the wing sections 150 and 152 to pivotally move from the transport position to the field position with the draft tubes 86 and 88 causing the tongue tube sections 30 and 32 to telescope with respect to one another. When the wing sections 150 and 152 are in the position of FIG. 1, the forward end of inner tongue tube 30 will be in the position illustrated in FIG. 2. The hydraulic cylinder 64 is then retracted so that the hitch 58 is moved from the position of FIG. 3 to the position of FIG. 2 with the latch bar 52 being moved out of engagement with the hook 38 so that the hook portion 42 of hook 38 may again engage latch 44 to prevent inner tongue tube 30 moving rearwardly with respect to outer tongue tube 32 thereby locking tongue 34 in its field position.

The folding tool bar of this invention is cheaper to produce than the tool bar of applicant's U.S. Pat. No. 5,113,956 with that cost reduction being achieved without sacrificing strength, heft, performance, durability or the artistic-marketability of the unit. The number of parts required to complete the folding tool bar of this invention, as compared to the folding tool bar of the '956 patent, has been reduced by nearly one-half. With respect to the center section of the instant invention, the vertical pins, about which the wings rotate when shifting from road to field positions and vice versa, has been moved twelve inches forward and ten inches inward from that of the '956 patent which results in the replacement of thirty-two pieces with nine pieces. The wing-to-wing attached position on the front tube of the wings will never interfere with the attachment of a row unit thereto. The front tubes on the wings are in line with the wing hinge tubes and are continued to a point twenty-one inches from the end of the row unit-carrying rear tube of the wing, increasing the draft strength of the wing.

The relocation of structural elements allows for the front draft tube anchor to be built with two pieces versus twelve pieces of the '956 patent and the support 98 to be built with three pieces versus twelve pieces of the '956 device. The tool bar of this invention has many other advantages over that of the prior art. The design of the center tool bar section 22, wing hinges 90 and 102, etc., enables the tool bar to have a more narrow transport width than that of the prior art. The design also enables planter units to be mounted thereon in a convenient fashion for 15", 18", 20", 22", 30", 32" and 36" row spacings through conventional U-bolt assemblies. The relatively thin steel plates 134 do not interfere with the adjustable row spacing of the planter units on the tool bars 132 and 136. The gauge wheel assemblies are also easily movable to accommodate different row openings. The design also provides a very strong or robust tool bar which enables the tool bar to have very great widths. The design of the tubes 122 and 130 and tubes 150 and 152 is such that stock folding tool bars may be connected to the outer ends of tubes 150 and 152.

Inasmuch as the tubes 122 and 130 extend to almost the outer ends of the tool bars 132 and 136, hydraulic hoses may be supported thereon which eliminates the prior art method of cutting holes in the tool bar itself to accommodate the hydraulic hoses. Additionally, the outer ends of the tubes 122 and 130 may be capped or sealed with air inlets being provided on the inner ends thereof so that the tubes 122 and 130 may serve as air tubes if the planter units are of the air type. In such a case, air couplings will be provided along the length of the tubes 122 and 130 to power the air planter units.

It can therefore be seen that a robust forwardly folding tool bar has been provided which represents an improvement over applicant's earlier device.

Thus it can be seen that the invention accomplishes at least all of its stated objectives.

I claim:

1. A forwardly folding tool bar, comprising:

an elongated, transversely extending center tool bar section having first and second ends and rearward and forward sides;

a support means secured to said center tool bar section which extends forwardly therefrom;

said support means having a first end, a second end, a rearward end and a forward end;

said center tool bar section having height adjustable ground engaging wheels mounted thereon;

an elongated inner tongue tube having rearward and forward ends;

said inner tongue tube being secured at its rearward end to said center tool bar section and extending forwardly therefrom;

an elongated right wing hinge having inner and outer ends;

said inner end of said right wing hinge being pivotally secured to said first end of said support means forwardly of said rearward end thereof;

said right wing hinge being selectively movable between a field position, wherein said right wing hinge is parallel to said center tool bar section and positioned forwardly thereof, to a transport position, wherein said right wing hinge is positioned generally parallel to said inner tongue tube and laterally outwardly therefrom;

a first hydraulic cylinder interconnecting said support means and said right wing hinge for moving said right wing hinge between its said field position and its said transport position;

an elongated left wing hinge having inner and outer ends;

said inner end of said left wing hinge being pivotally secured to said second end of said support means forwardly of the rearward end thereof;

said left wing hinge being selectively movable between a field position, wherein said left wing hinge is parallel to said center tool bar section and positioned forwardly thereof, to a transport position, wherein said left wing hinge is positioned to generally parallel to said inner tongue tube and laterally outwardly therefrom;

a second hydraulic cylinder interconnecting said support means and said left wing hinge for moving said left wing hinge between its said field position and its said transport position;

a right front wing tube having inner and outer ends;

said inner end of said right front wing tube being pivotally secured, about a horizontal axis, to said outer end of said right wing hinge;

a left front wing tube having inner and outer ends;

said inner end of said left front wing tube being pivotally secured, about a horizontal axis, to said outer end of said left wing hinge;

said right and left front wing tubes being movable between transport and field positions with said right and left wing hinges, respectively;

a right tool bar secured to said right front wing tube rearwardly thereof for movement therewith between field and transport positions;

a left tool bar secured to said left front wing tube rearwardly thereof for movement therewith between field and transport positions;

said center tool bar section and said right and left tool bars adapted to have row units mounted thereon;

each of said right and left tool bars having a height adjustable gauge wheel assembly mounted thereon;

an outer tongue tube slidably embracing said inner tongue tube and having a rearward end, a forward end and upper and lower ends;

an elongated hitch having rearward and forward ends;

said hitch being pivotally secured at its said rearward end to said outer tongue tube rearwardly of the forward end thereof and extending forwardly therefrom so that said forward end of said hitch is disposed forwardly of the forward ends of said inner and outer tongue tubes;

said forward end of said hitch being connectable to a prime mover;

a third hydraulic cylinder pivotally secured to said hitch and said outer tongue tube and extending therebetween;

said third hydraulic cylinder being movable between extended and retracted positions;

said third hydraulic cylinder, when in its said retracted position, causing said forward end of said outer tongue tube to be positioned in a field position;

said third hydraulic cylinder, when in its said extended position, causing said forward end of said outer tongue tube to be raised to a transport position;

a first elongated draft tube having rearward and forward ends;

said rearward end of said first draft tube being operatively pivotally secured to said right tool bar;

said forward end of said first draft tube being pivotally secured to said outer tongue tube;

a second elongated draft tube having rearward and forward ends;

said rearward end of said second draft tube being operatively pivotally secured to said left tool bar;

said forward end of said second draft tube being pivotally secured to said outer tongue tube;

said inner tongue tube slidably moving rearwardly relative to said outer tongue tube as said wing hinges and said wing tubes are moved from their field positions to their transport positions;

said inner tongue tube being locked against relative movement with respect to said outer tongue tube when said hitch is in its said field position;

said inner tongue tube being free for relative movement with respect to said outer tongue tube when said hitch is in its said transport position.

2. The forwardly folding tool bar of claim 1 wherein a latching member is movably secured to said forward end of said inner tongue tube and is movable between latched and unlatched positions; said latching member, when in its said latched position, engaging said outer tongue tube to prevent relative movement therebetween; said latching member, when in its said unlatched position, permitting relative movement between said inner and outer tongue tubes.

3. The forwardly folding tool bar of claim 2 wherein a latch bar is connected to said hitch for moving said latching member to said unlatched position when said hitch is in its said transport position.

4. The forwardly folding tool bar of claim 3 wherein said latching member comprises a hook.

5. The forwardly folding tool bar of claim 3 wherein said latching member is automatically moved to its said latched position when said hitch is moved to its said transport position.

6. The forwardly folding tool bar of claim 1 wherein each of said right and left tool bars have inner and outer ends and wherein said inner ends thereof are positioned adjacent to the ends of said center tool bar section.

7. The forwardly folding tool bar of claim 1 wherein said right or left tool bars are connected to said right and left front wing tubes, respectively, by horizontally spaced-apart and vertically disposed plates.

8. A forwardly folding tool bar, comprising:

an elongated, transversely extending center tool bar section having first and second ends and rearward and forward sides;

a support means secured to said center tool bar section which extends forwardly therefrom;

said center tool bar section having height adjustable ground engaging wheels mounted thereon;

a selectively extendible tongue having rearward and forward ends;

said tongue including inner and outer tongue tubes;

said inner tongue tube being secured at its rearward end to said center tool bar section and extending forwardly therefrom;

an elongated right wing hinge having inner and outer ends;

said inner end of said right wing hinge being pivotally secured to said first end of said support means forwardly of said rearward end thereof;

said right wing hinge being selectively movable between a field position, wherein said right wing hinge is parallel to said center tool bar section and positioned forwardly thereof, to a transport position, wherein said right wing hinge is positioned generally parallel to said inner tongue tube and laterally outwardly therefrom;

a first hydraulic cylinder interconnecting said support means and said right wing hinge for moving said right wing hinge between its said field position and its said transport position;

a left wing hinge having inner and outer ends;

said inner end of said left wing hinge being pivotally secured to said second end of said support means forwardly of the rearward end thereof;

said left wing hinge being selectively movable between a field position, wherein said left wing hinge is parallel to said center tool bar section and positioned forwardly thereof, to a transport position, wherein said left wing hinge is positioned generally parallel to said inner tongue tube and laterally outwardly therefrom;

a second hydraulic cylinder interconnecting said support means and said left wing hinge for moving said left wing hinge between its said field position and its said transport position;

a right front wing tube having inner and outer ends;

said inner end of said right front wing tube being pivotally secured, about a horizontal axis, to said outer end of said right wing hinge;

a loft front wing tube having inner and outer ends;

said inner end of said left front wing tube being pivotally secured, about a horizontal axis, to said outer end of said left wing hinge;

said right and left front wing tubes being movable between transport and field positions with said right and left wing hinges, respectively;

a right tool bar secured to said right front wing tube rearwardly thereof for movement therewith between field and transport positions;

a left tool bar secured to said left front wing tube rearwardly thereof for movement therewith between field and transport positions;

said center tool bar section and said right and left tool bars adapted to have row units mounted thereon;

each of said right and left tool bars having a height adjustable gauge wheel assembly to mounted thereon;

a hitch secured to the forward end of said outer tongue tube;

said hitch being connectable to a prime mover;

a first elongated draft tube having rearward and forward ends;

said rearward end of said first draft tube being operatively pivotally secured to said right tool bar;

said forward end of said first draft tube being pivotally secured to said outer tongue tube;

a second elongated draft tube having rearward and forward ends;

said rearward end of said second draft tube being operatively pivotally secured to said left tool bar;

said forward end of said second draft tube being pivotally secured to said outer tongue tube;

said inner tongue tube slidably moving rearwardly relative to said outer tongue tube as said wing hinges and said wing tubes are moved from their field positions to their transport positions;

said inner tongue tube being locked against relative movement with respect to said outer tongue tube when said wing hinges and wing tubes are in their field positions;

said inner tongue tube being free for relative movement with respect to said outer tongue tube when said wing hinges and wing tubes are in their field positions.

9. The forwardly folding tool bar of claim 8 wherein each of said right and left tool bars have inner and outer ends and wherein said inner ends thereof are positioned adjacent the ends of said center tool bar section.

10. The forwardly folding tool bar of claim 8 wherein said right or left tool bars are connected to said right and left front wing tubes, respectively, by horizontally spaced-apart and vertically disposed plates.

11. The forwardly folding tool bar of claim 8 wherein said hitch is elongated and has rearward and forward ends, said hitch being pivotally secured at its said rearward end to said outer tongue tube rearwardly of the forward end thereof and extending forwardly therefrom so that said forward end of said hitch is disposed forwardly of the forward ends of said inner and outer tongue tubes; a third hydraulic cylinder pivotally secured to said hitch and said outer tongue tube and extending therebetween; said third hydraulic cylinder being movable between extended and retracted positions; said third hydraulic cylinder, when in its said retracted position, causing said forward end of said outer tongue tube to be positioned in a field position; said third hydraulic cylinder, when in its said extended position, causing said forward end of said outer tongue tube to be raised to a transport position.

12. The forwardly folding tool bar of claim 11 wherein a latching member is movably secured to said forward end of said inner tongue tube and is movable between latched and unlatched positions; said latching member, when in its said latched position, engaging said outer tongue tube to prevent relative movement therebetween; said latching member, when in its said unlatched position, permitting relative movement between said inner and outer tongue tubes.

13. The forwardly folding tool bar of claim 12 wherein a latch bar is connected to said hitch for moving said latching member to said unlatched position when said hitch is in its said transport position.

14. The forwardly folding tool bar of claim 13 wherein said latching member comprises a hook.

15. The forwardly folding tool bar of claim 13 wherein said latching member is automatically moved to its said latched position when said hitch is moved to its said transport position.

* * * * *